United States Patent
Sperry et al.

(10) Patent No.: US 7,467,939 B2
(45) Date of Patent: Dec. 23, 2008

(54) MATERIAL DELIVERY TENSION AND TRACKING SYSTEM FOR USE IN SOLID IMAGING

(75) Inventors: Charles R. Sperry, Florence, MA (US); Dennis F. McNamara, Charlestown, NY (US); Suzanne M. Scott, Springfield, VT (US)

(73) Assignee: 3D Systems, Inc., Rock Hill, SC (US)

( * ) Notice: Subject to any disclaimer, the term of this patent is extended or adjusted under 35 U.S.C. 154(b) by 146 days.

(21) Appl. No.: 11/416,812

(22) Filed: May 3, 2006

(65) Prior Publication Data

US 2007/0259066 A1    Nov. 8, 2007

(51) Int. Cl.
  *B29B 13/08*    (2006.01)
(52) U.S. Cl. ............ 425/375; 425/174.4; 264/113; 264/308; 264/497
(58) Field of Classification Search ......... 425/375, 425/174.4; 264/308, 401, 497, 113
See application file for complete search history.

(56) References Cited

U.S. PATENT DOCUMENTS

| | | |
|---|---|---|
| 4,752,498 A | 6/1988 | Fudim |
| 5,014,207 A | 5/1991 | Lawton |
| 5,049,901 A | 9/1991 | Gelbart |
| 5,094,935 A | 3/1992 | Vassiliou et al. |
| 5,096,530 A | 3/1992 | Cohen |
| 5,122,441 A | 6/1992 | Lawton et al. |
| 5,132,723 A | 7/1992 | Gelbart |
| 5,143,817 A | 9/1992 | Lawton et al. |
| 5,158,858 A | 10/1992 | Lawton et al. |
| 5,171,490 A | 12/1992 | Fudim |
| 5,192,559 A | 3/1993 | Hull et al. |
| 5,236,812 A | 8/1993 | Vassiliou et al. |
| 5,247,180 A | 9/1993 | Mitcham et al. |
| 5,306,446 A | 4/1994 | Howe |
| 5,391,072 A | 2/1995 | Lawton et al. |
| 5,429,908 A | 7/1995 | Hokuf et al. |
| 5,447,822 A | 9/1995 | Hull et al. |
| 5,474,719 A | 12/1995 | Fan et al. |
| 5,529,473 A | 6/1996 | Lawton et al. |
| 5,650,260 A | 7/1997 | Onishi |
| 6,051,179 A | 4/2000 | Hagenau |
| 6,066,285 A * | 5/2000 | Kumar ............ 264/439 |

(Continued)

FOREIGN PATENT DOCUMENTS

DE    19957370 A1    11/1999

(Continued)

OTHER PUBLICATIONS

U.S. Appl. No. 11/856,378, filed Sep. 17, 2007.

(Continued)

*Primary Examiner*—Yogendra Gupta
*Assistant Examiner*—Maria Veronica D Ewald
(74) *Attorney, Agent, or Firm*—William A. Simons; Keith A. Roberson (57) ABSTRACT

A solid imaging apparatus and method employing a radiation transparent build material carrier and a build material dispensing system that accurately controls the thickness of the transferred layer of solidifiable liquid build material to the radiation transparent build material carrier to achieve high resolution imaging in three-dimensional objects built using an electro-optical radiation source.

11 Claims, 8 Drawing Sheets

U.S. PATENT DOCUMENTS

| | | | |
|---|---|---|---|
| 6,120,404 A * | 9/2000 | Walworth et al. | 474/114 |
| 6,174,156 B1 | 1/2001 | Chapman et al. | |
| 6,206,672 B1 * | 3/2001 | Grenda | 425/174.4 |
| 6,391,245 B1 | 5/2002 | Smith | |
| 6,500,378 B1 * | 12/2002 | Smith | 264/401 |
| 6,547,552 B1 | 4/2003 | Fudim | |
| 6,641,772 B2 | 11/2003 | Gelbart | |
| 6,665,048 B2 | 12/2003 | Gelbart | |
| 6,733,267 B2 | 5/2004 | Chapman et al. | |
| 6,792,327 B1 | 9/2004 | Bamford | |
| 6,824,714 B1 | 11/2004 | Turck et al. | |
| 6,942,830 B2 | 9/2005 | Mulhaupt et al. | |
| 6,965,364 B1 | 11/2005 | Eggers et al. | |
| 7,052,263 B2 | 5/2006 | John | |
| 7,090,484 B2 | 8/2006 | Ueno | |
| 7,128,866 B1 | 10/2006 | Henningsen | |
| 7,158,849 B2 | 1/2007 | Huang et al. | |
| 7,195,472 B2 | 3/2007 | John | |
| 7,261,542 B2 * | 8/2007 | Hickerson et al. | 425/174.4 |
| 2002/0145213 A1 * | 10/2002 | Liu et al. | 264/40.1 |
| 2002/0153640 A1 | 10/2002 | John | |
| 2003/0021823 A1 | 1/2003 | Landers et al. | |
| 2004/0173946 A1 * | 9/2004 | Pfeifer et al. | 264/497 |
| 2005/0248061 A1 | 11/2005 | Shkolnik et al. | |
| 2005/0248062 A1 | 11/2005 | Shkolnik et al. | |
| 2006/0249884 A1 * | 11/2006 | Partanen et al. | 264/401 |
| 2007/0063389 A1 | 3/2007 | John | |
| 2007/0257055 A1 | 11/2007 | Scott et al. | |

FOREIGN PATENT DOCUMENTS

| | | |
|---|---|---|
| DE | 10119817 A1 | 10/2002 |
| DE | 10256672 A1 | 6/2004 |
| EP | 549993 B1 | 3/1997 |
| EP | 676275 B1 | 7/2000 |
| EP | 1253002 A1 | 10/2002 |
| EP | 1439051 A2 | 7/2004 |
| EP | 1439052 A2 | 7/2004 |
| EP | 1274559 B1 | 2/2005 |
| EP | 1250997 B1 | 11/2005 |
| JP | 2002370286 A | 12/2002 |
| JP | 6039928 A | 12/2007 |

OTHER PUBLICATIONS

U.S. Appl. No. 11/856,405, filed Sep. 17, 2007.
U.S. Appl. No. 11/856,428, filed Sep. 17, 2007.
U.S. Appl. No. 11/856,172, filed Sep. 17, 2007.
U.S. Appl. No. 11/856,183, filed Sep. 17, 2007.
U.S. Appl. No. 11/856,225, filed Sep. 17, 2007.
U.S. Appl. No. 11/856,209, filed Sep. 17, 2007.
U.S. Appl. No. 11/856,241, filed Sep. 17, 2007.
U.S. Appl. No. 11/856,270, filed Sep. 17, 2007.
U.S. Appl. No. 11/856,455, filed Sep. 17, 2007.
English Translation of DE 19957370A1.

* cited by examiner

MATERIAL DELIVERY TENSION AND TRACKING SYSTEM FOR USE IN SOLID IMAGING

FIELD OF INVENTION

The present invention is directed to forming cross-sectional layers with an image projection system using a solidifiable build material in an apparatus for forming three-dimensional objects on a layer-by-layer basis. More particularly, it is directed to an apparatus and method for controlling the tension and tracking of an endless belt used to deliver in a desired thickness the solidifiable liquid build material used to form the three-dimensional object being built in response to exposure by UV or visible radiation.

BACKGROUND OF THE INVENTION

In recent years, many different techniques for the fast production of three-dimensional models have been developed for industrial use. These solid imaging techniques are sometimes referred to as rapid prototyping and manufacturing ("RP&M") techniques. In general, rapid prototyping and manufacturing techniques build three-dimensional objects layer-by-layer from a working medium utilizing a sliced data set representing cross-sections of the object to be formed. Typically, an object representation is initially provided by a Computer Aided Design (CAD) system.

Stereolithography, presently the most common RP&M technique, was the first commercially successful solid imaging technique to create three-dimensional objects from CAD data. Stereolithography may be defined as a technique for the automated fabrication of three-dimensional objects from a fluid-like material utilizing selective exposure of layers of the material at a working surface to solidify and adhere successive layers of the object (i.e. laminae). In stereolithography, data representing the three-dimensional object is input as, or converted into, two-dimensional layer data representing cross-sections of the object. Layers of material are successively formed and selectively transformed or solidified (i.e. cured) most often using a computer controlled laser beam of ultraviolet (UV) radiation into successive laminae according to the two-dimensional layer data. During transformation, the successive laminae are bonded to previously formed laminae to allow integral formation of the three-dimensional object. This is an additive process. More recent designs have employed the use of visible light to initiate the polymerization reaction to cure the photopolymer build material that is commonly referred to as resin.

Stereolithography represents an unprecedented way to quickly make complex or simple parts without tooling. Since this technology depends on using a computer to generate its cross-sectional patterns, there is a natural data link to CAD/CAM. Such systems have encountered and had to overcome difficulties relating to shrinkage, curl and other distortions, as well as resolution, accuracy, and difficulties in producing certain object shapes. While stereolithography has shown itself to be an effective technique for forming three-dimensional objects, other solid imaging technologies have been developed over time to address the difficulties inherent in stereolithography and to provide other RP&M advantages.

These alternate technologies, along with stereolithography, have collectively been referred to as solid freeform fabrication or solid imaging techniques. They include laminated object manufacturing (LOM), laser sintering, fused deposition modeling (FDM), and various ink jet based systems to deliver either a liquid binder to a powder material or a build material that solidifies by temperature change or photocuring. Most recently a technology using digital light processing technology has employed visible light to initiate the photopolymerization reaction to cure a photopolymer build material, commonly referred to as a resin. Each of these additive technologies have brought various improvements in one or more of accuracy, building speed, material properties, reduced cost, and appearance of the build object.

All of the solid imaging or freeform fabrication techniques, to be successful, must form objects that are near full density or free of unintended voids or air pockets. Voids caused by air pockets create discontinuities and weaknesses in the objects being built, as well as not accurately reproducing the three-dimensional aspect of the object being created from the CAD representation. This problem is especially acute in technologies employing solidifiable liquid resin that is placed down layer-by-layer employing an intermediate transfer process. The use of an intermediate transfer surface from which the solidifable liquid resin is transferred to a support platform or an underlying layer of material reduces the amount of excess resin that must be removed from completed parts and eliminates the need to build in a vat or large container of resin. This does eliminate the cost of additional resin beyond what is necessary to build the then needed parts. However, it increases the need for reliable and consistent layer thickness in the transferred liquid resin and tracking and tension of the endless belt used as the transfer surface as cross-sections of material are formed.

Additionally, none of the prior solid freeform fabrication approaches, while making substantial improvements, have yet to achieve a truly low cost system that produces highly accurate and visually appealing three-dimensional objects in a short build time.

These problems are solved in the design of the present invention by employing a material transfer technique and apparatus in a low cost solid imaging technique in combination with the use of digital imaging projection or laser scanning in a manner that creates a three-dimensional object that accurately reflects the CAD representation while consistently applying uniform thicknesses of the solidifiable liquid resin used to form the three-dimensional object.

SUMMARY OF THE INVENTION

It is an aspect of the present invention that a solid imaging apparatus is provided that utilizes a radiation transparent build material carrier and build material dispensing system that accurately controls the thickness of the transferred layer of solidifiable liquid build material to achieve high resolution imaging in three-dimensional objects built using UV radiation or visible light and a photopolymer build material.

It is a feature of the present invention that a radiation transparent endless belt and belt tensioning system are employed to control the thickness of the layer of solidifiable liquid build material applied to the belt and transferred to a receiving substrate layer by layer to create a three-dimensional part.

It is another feature of the present invention that the solidifiable liquid build material is dispensed from a channel in a dispensing cartridge to the endless belt by means of a fluid wedge.

It is yet another feature of the present invention that a belt tracking and alignment system is used to keep the endless belt centered as it traverses its rotational path.

It is still another feature of the present invention that the tension on the endless belt controls the thickness of the layer of solidifiable build material applied to the endless belt, the greater the tension the thinner the layer.

It is a further feature of the present invention that optical sensors sense the presence of the endless belt at the edges of the belt and signal for correction to the belt tracking when no sensing is found at an edge.

It is an advantage of the present invention that a low cost solid imaging device is obtained that provides accurate and repeatable layers of build material during the building of three-dimensional objects.

It is another advantage of the present invention that the belt tensioning material dispensing design is simple and effective in producing three-dimensional objects built layer-by-layer.

These and other aspects, features, and advantages are obtained by the present invention through the use of a solid imaging apparatus and method that employ an endless belt as a radiation transparent build material carrier and a belt tensioning system to control a fluid wedge formed at the dispenser to control the thickness of the layer of solidifiable liquid build material applied to the belt and transferred to a receiving substrate.

BRIEF DESCRIPTION OF THE DRAWINGS

These and other aspects, features and advantages of the invention will become apparent upon consideration of the following detailed disclosure of the invention, especially when taken in conjunction with the following drawings wherein.

DETAILED DESCRIPTION OF THE PREFERRED EMBODIMENT

Flexible transport solid imaging of the type disclosed herein involves employing an appropriate electro-optical radiation source in the layer-by-layer build-up of articles from a radiation curable liquid photopolymer material that is delivered by the flexible transport endless belt or reciprocatable sheet of film. The radiation source can employ any wavelength of radiation conducive to reflection from the electromagnetic spectrum, such as light valve technology with electron or particle beams, but preferably employs visible or UV radiation. Liquid photopolymer material is applied to the endless flexible belt or reciprocatable sheet of film from a cartridge employing an appropriate coating device, such as a gravure wheel or fluid wedge, that transfers the photopolymer build material to the flexible transport device to provide fresh material to create new layers as the three-dimensional object is built. The photopolymer build material is transferred via transfer means to a receiving substrate without entrapping air bubbles in the transferred layers. The photopolymer build material is preferably imaged by radiation projected from either a digital UV projector or a digital visible light projector and solidified layer-by-layer. The projector includes a spatial light modulator, such as a digital micro-mirror device ("DMD") that selectively illuminates pixels for imaging. Visible light projection is a preferred approach.

Solid imaged parts are preferably built on an elevator platform that moves the build object or part up into contact with the liquid photopolymer build material and, after exposure, down and out of contact with the liquid photopolymer build material as successive layers or laminae are formed during the building process. The build object can be built on structures known as supports rather than directly on the elevator platform. Supports are used for more complex three-dimensional objects being built that have unsupported or partially unsupported surfaces.

Commercially available digital light projectors, optionally modified to have a shorter focal length, may be employed, such as those available from InFocus Corporation of Wilsonville, Oreg. and BenQ America Corp. of Irvine, Calif.

In one application of the present invention, the photopolymer build material is delivered to the imaging area via a radiation transparent flexible build material carrier film, such as polypropylene or polycarbonate. The photopolymer build material is applied in a thin layer to the flexible build material carrier or transport film in the embodiment shown in FIG. 1.

Figure 1:
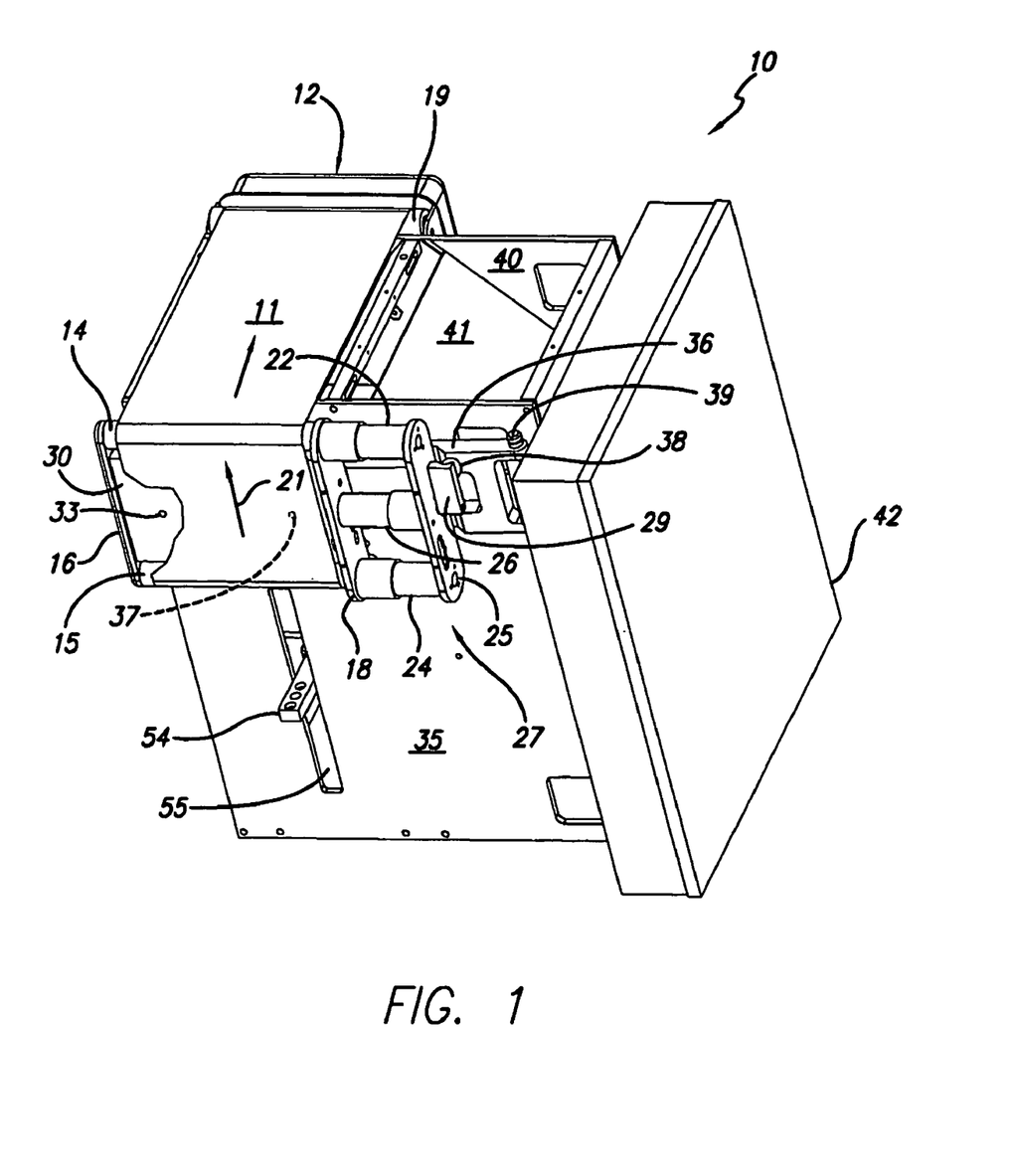
FIG. 1 is a front perspective view of a flexible transport solid imaging system utilizing a radiation transparent endless flexible belt as the build material transfer means and a tracking and tensioning apparatus.
Figure 3:
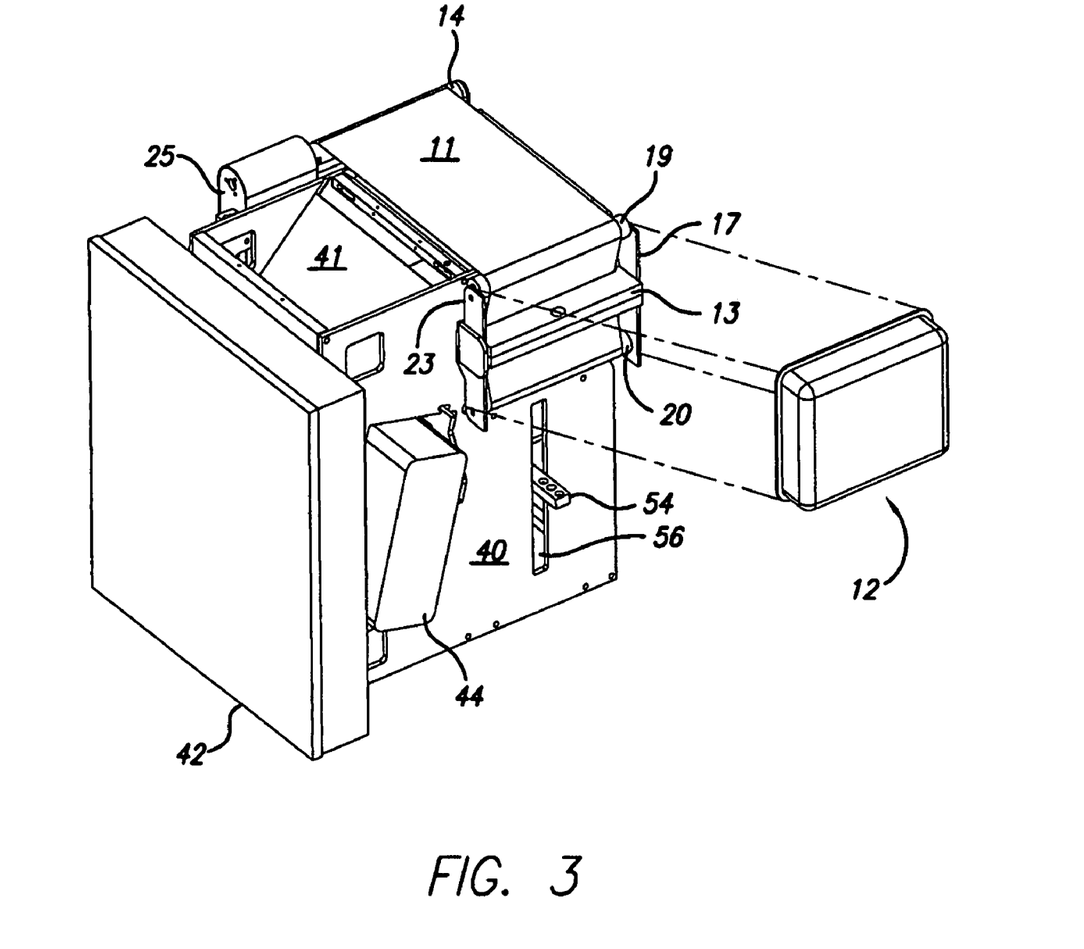
FIG. 3 is a rear perspective view of a flexible transport solid imaging system showing the radiation transparent endless flexible belt, light projector and build material feed cartridge.

As seen in FIG. 1, a flexible transport imaging system with covers removed is indicated generally by the numeral 10. Flexible transport imaging system 10 has a radiation transparent build material carrier in the form of an endless belt 11 that is positioned about a drive rollers 14 and 15 and follower or idler rollers 19 and 20. A build material feed cartridge assembly is indicated generally by the numeral 12. The cartridge assembly 12 and the idler rollers 14 and 15 are fixed in their relative positions. Belt 11 is driven in the direction indicated by arrow 21 by electrical drive motors 22 and 24 that drive rollers 14 and 15, respectively. The vertical distance between drive rollers 14 and 15 is fixed, but the horizontal distance between the drive rollers 14 and 15 and idler rollers 19 and 20 is variable to control the tension in endless belt 11. Idler rollers 19 and 20, as seen in FIG. 3, are rotatably mounted between vertical frame members 17 and 23.

Figure 4:
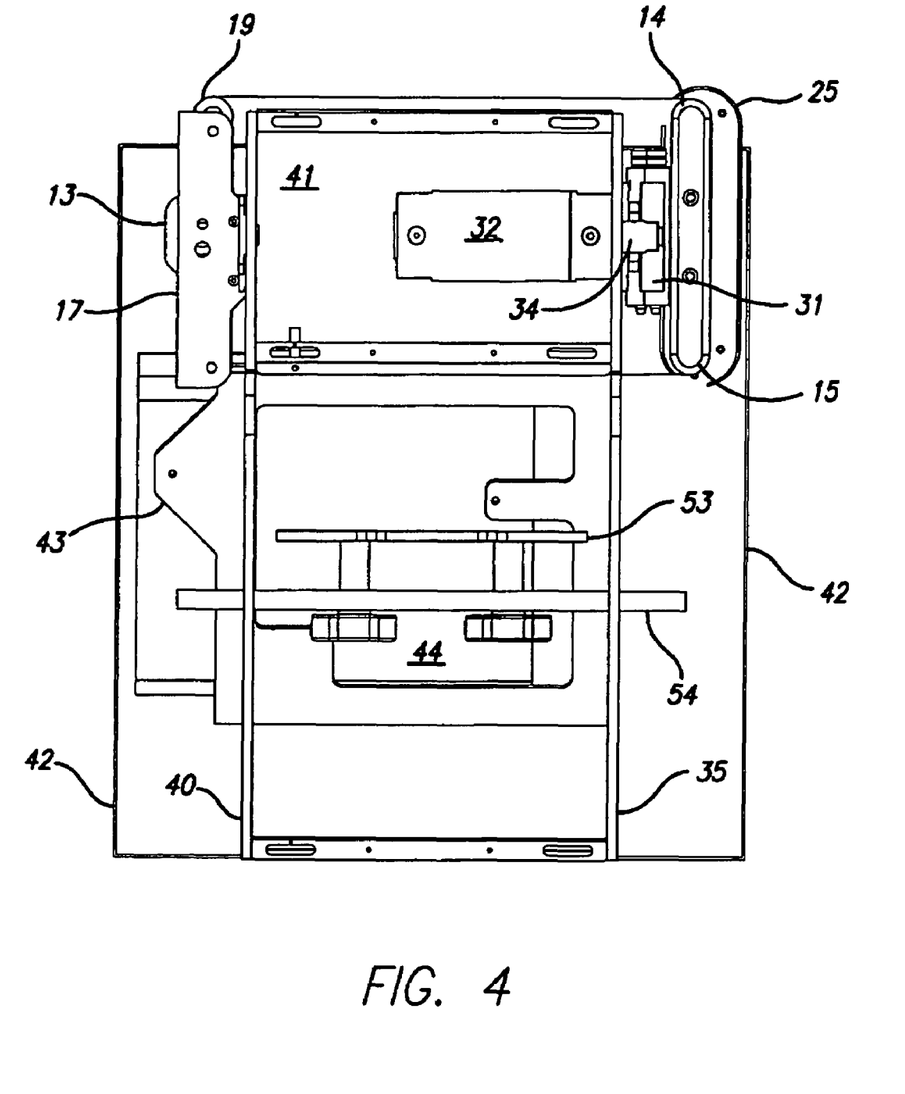
FIG. 4 is a front elevational view of a flexible transport solid imaging system.
Figure 5:
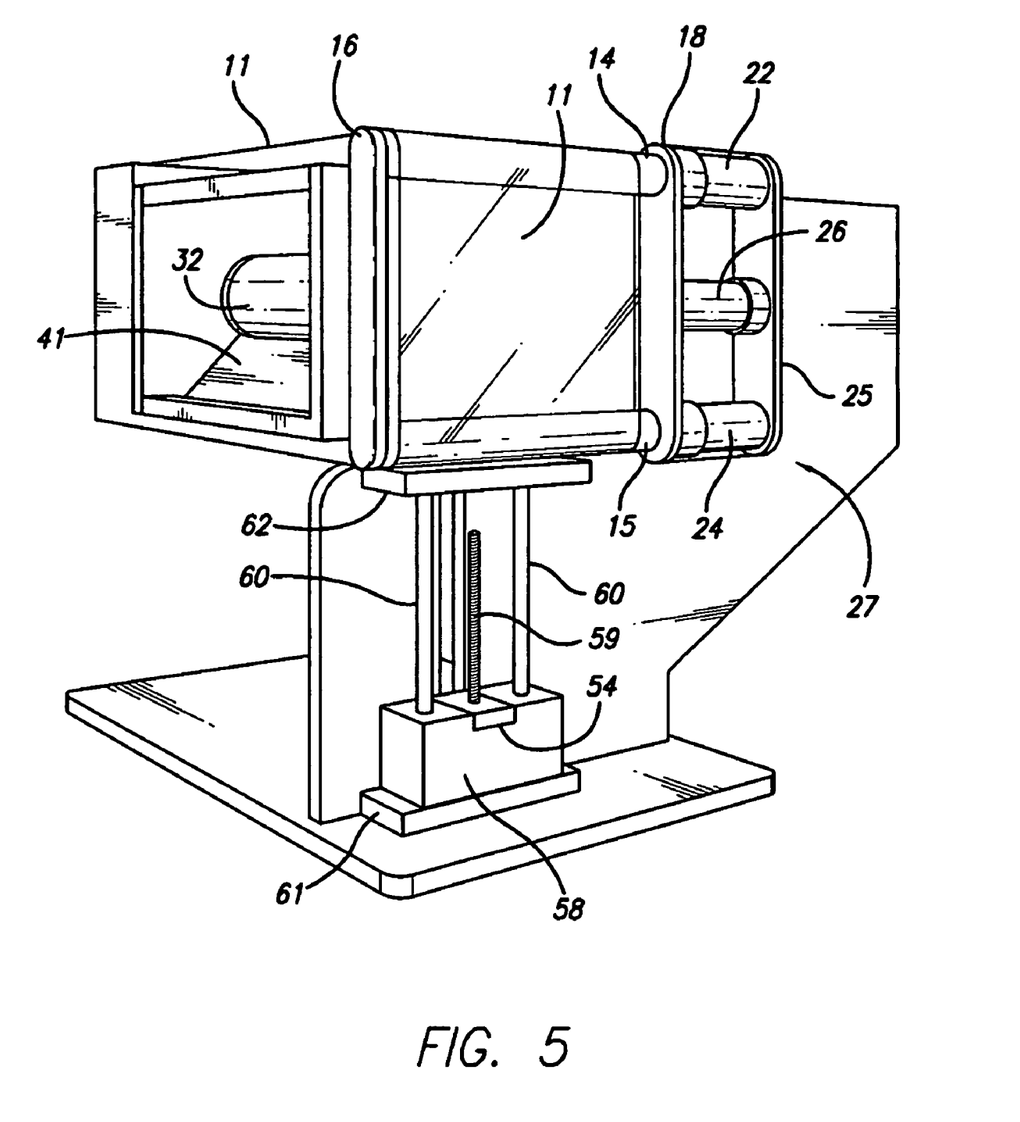
FIG. 5 is a front perspective view of an embodiment of a flexible transport solid imaging system and one stepper motor used to raise and lower the support platform to which solidifiable liquid build material is transferred from the radiation transparent endless flexible belt to form a three-dimensional object on the support platform.

A digital light projector is the radiation source 44, see FIG. 3, that projects an image with selected pixels for illumination onto a mirror system 41 below the upper run of endless belt 11 in the exposure of a cross-section of a three-dimensional object being formed on a support platform 53, best seen in FIG. 4. As illustrated in the embodiment seen in FIG. 5, the support platform 53 is raised and lowered by a stepper motor 58. In the embodiment of FIGS. 1-4 a pair of stepper motors 58 is employed that ride up a threaded lead screw 59 and guide rails 60 on opposing sides of the imaging system 10. The guide rails 60 are held in place by guide rail anchor plates 61 and 62 appropriately fastened to the system frame. A support platform assembly bar 54 is fastened to each stepper motor 58.

As best seen in FIGS. 14, support platform assembly bar 54 extends through slots 55 and 56 in frame end plates 35 and 40, respectively. This enables the support platform assembly bar 54 to move with the stepper motors 58 to raise and lower the support platform 53. This brings the already formed cross-sectional layers into contact with the layer of resin or solidifiable liquid build material 47 that is deposited on endless belt 11 from the resin or solidifiable liquid medium cartridge dispenser 13 that is a part of build material feed cartridge assembly 12. Cartridge dispenser 13 includes a resin reservoir of solidifiable liquid medium and a dispensing slit or channel 45, see briefly FIG. 8, through which the solidifiable liquid build material is applied to belt 11.

Figure 2:
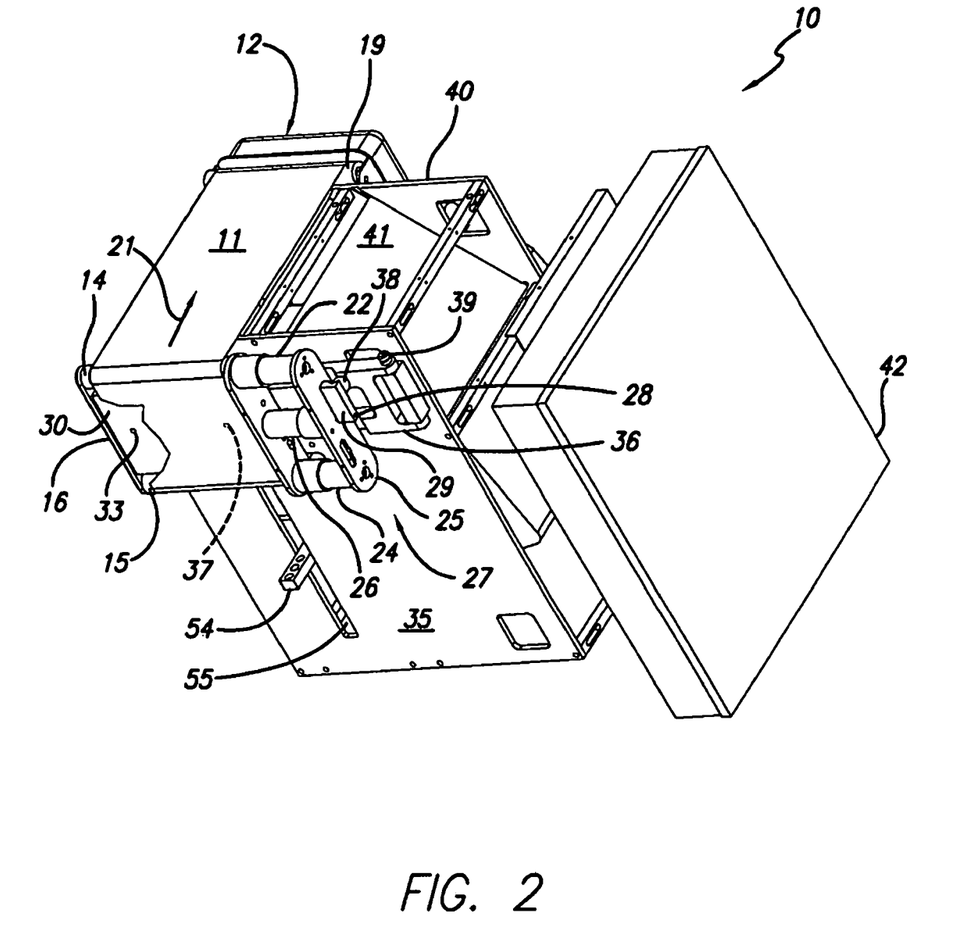
FIG. 2 is a partially exploded front perspective view of a flexible transport solid imaging system showing the radiation transparent endless flexible belt and the tracking and tensioning apparatus.

FIGS. 1 and 2 show the drive roller carriage, indicated generally by the numeral 27. Drive rollers 14 and 15 are rotatably mounted between vertical frame members 16 and 18. Drive motors 22 and 24 are mounted to vertical frame member 18 and are drivingly connected to drive rollers 14 and 15. Drive roller vertical frame member 25 is attached to the end of the drive motors. Belt tracking motor 26 controls the tracking of belt 11 as belt 11 rotates about rollers 14, 15, 19 and 20 and faces in the opposite direction of drive motors 22 and 24. Motor shaft 28, best seen in FIG. 2, extends through frame member 25 from motor 26. A belt tracking control arm 29 is attached to the end of shaft 28. A tracking control arm frame member 30 connects frame members 16 and 18 and includes a pivot attachment 31, see briefly FIGS. 4 and 6, that is used to mount the drive roller carriage 27. Left edge belt tracking optical sensor 33 and right edge belt tracking optical sensor 37 are mounted to frame member 30 as seen in FIGS. 1 and 2.

Figure 6:
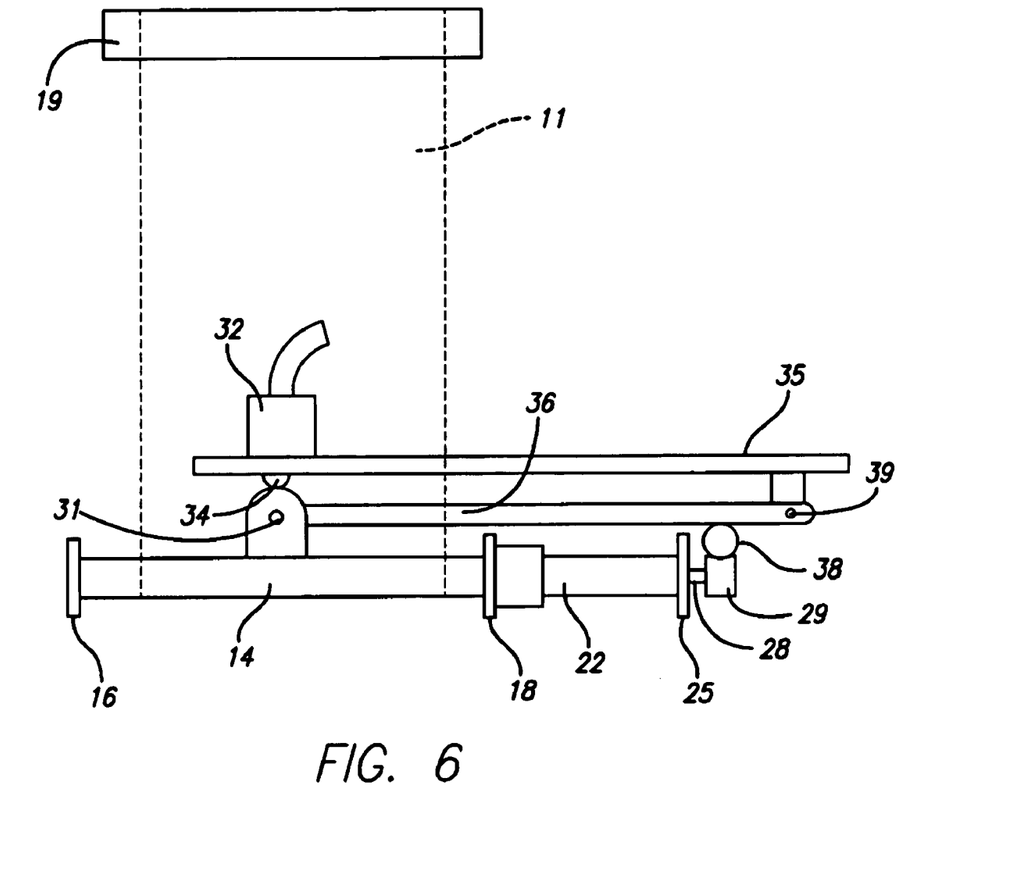
FIG. 6 is a diagrammatic illustration of a top plan view of the endless flexible belt tracking and sensing system.

FIG. 6 is diagrammatical illustration of a top plan view of the drive roller carriage 27. Drive roller 14, idler roller 19 and endless belt 11 (in phantom lines) are shown, along with vertical frame members 16, 18 and 25. Mounting arm 36 is attached between pivot attachment 31 on the drive roller carriage and the pivot 39 on the frame end plate 35. The pivot point on pivot attachment 31 is offset a small distance from the center of attachment 31. An air cylinder 32 mounts through end plate 35 so that cylinder plunger 34 contacts the back of pivot attachment 31 on the back of tracking control arm frame member 30 of FIGS. 1 and 2. When air cylinder 32 of FIG. 6 is pressurized, the plunger 34 exerts a force on the drive roller carriage via pivot attachment 31. The entire drive roller carriage moves about pivot 39 which movement extends the distance between drive rollers 14 and 15 and idler rollers 19 and 20, thereby putting tension on the endless belt 11 when the plunger 34 is extended or shortening the distance, thereby reducing tension, when it is retracted. A desired tension can thus be maintained on the endless belt 11.

Figure 8:
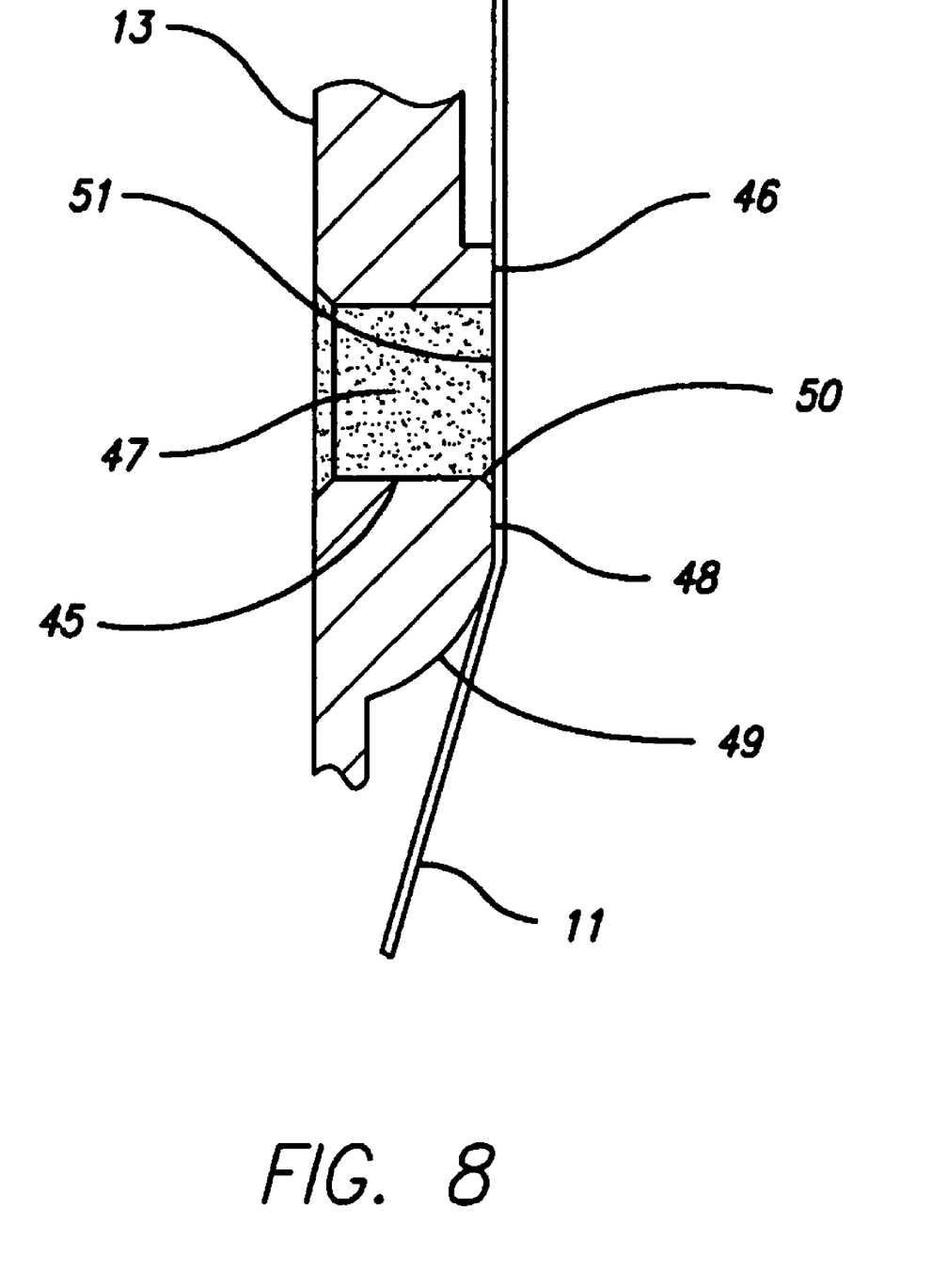
FIG. 8 is a diagrammatic illustration of a dispensing slit or channel in the build material cartridge dispenser across which the endless belt travels vertically downwardly.

The tension in the belt 11 controls the thickness of the solidifiable liquid build material 47 applied to the endless belt 11 as the belt 11 travels vertically downwardly across the dispensing slit or channel 45 in build material cartridge dispenser 13, as seen in FIG. 8. The dispensing slit or channel 45 supplies build material from the reservoir (not shown) within cartridge dispenser 13 to the surface 51 of the belt 11. The cartridge dispenser 13 has a flat section above and below the channel 45, indicated by the numerals 46 and 48, respectively, and an arcuate section 49 with large radius at the bottom to provide clearance for the build material 47 on the coated surface 51 of belt 11 as the belt is driven in its path about rollers 14, 15, 19 and 20. Alternatively, section 49 can be at an acute angle or a right angle to provide the required clearance.

As belt 11 moves past channel 45, a fluid wedge develops at the bottom edge 50 of the channel 45 that applies an even coating onto the belt 11 via the fluid wedge effect so that the greater the tension, the thinner is the coating. The cartridge dispenser 13 can have a reservoir of liquid build material 47 integral with it or remotely from it. If positioned remotely from dispenser 13, the reservoir is in fluid flow communication with the dispenser 13 so that the reservoir can be replaced separately from the cartridge dispenser 13.

The coating thickness is monitored by an appropriate sensor, such as a pattern recognition device. If the coating thickness is too thick, the cylinder plunger 34 will slowly be extended so as to increase the belt 11 tension and decrease the fluid wedge, thereby making the coating thinner until the correct thickness coating is obtained. Alternately, if the coating is too thin, the plunger 34 will be retracted, decreasing the belt 11 tension and thereby increasing the fluid wedge making the coating thicker until the desired thickness is obtained. Coating thickness can be controlled to 0.002 inches for faster imaging or to 0.001 inches for slower imaging. The air cylinder 32 can exert between 10 to 20 pounds per square inch against the belt 11 to ensure the belt is taut about rollers 14, 15, 19 and 20. Any other effective device can be used to exert pressure on the belt 11, such as a solenoid valve, spring or other appropriate mechanical system. The fluid wedge can be effectively created whether there is an angled bottom edge 50 or a straight or rounded bottom surface to the channel 45. The effectiveness of the fluid wedge is a function of a number of factors including the viscosity of the solidifiable liquid build material 47, the surface tension between the build material 47 and the belt 11, the pressure head of liquid build material 47 in the cartridge dispenser 13, the height of the opening of the dispensing channel 45, the length of the flat sections 46 and 48, and the speed and tension of the belt 11 as it traverses about rollers 14, 15, 19, and 20 and past channel 50.

Figure 7:
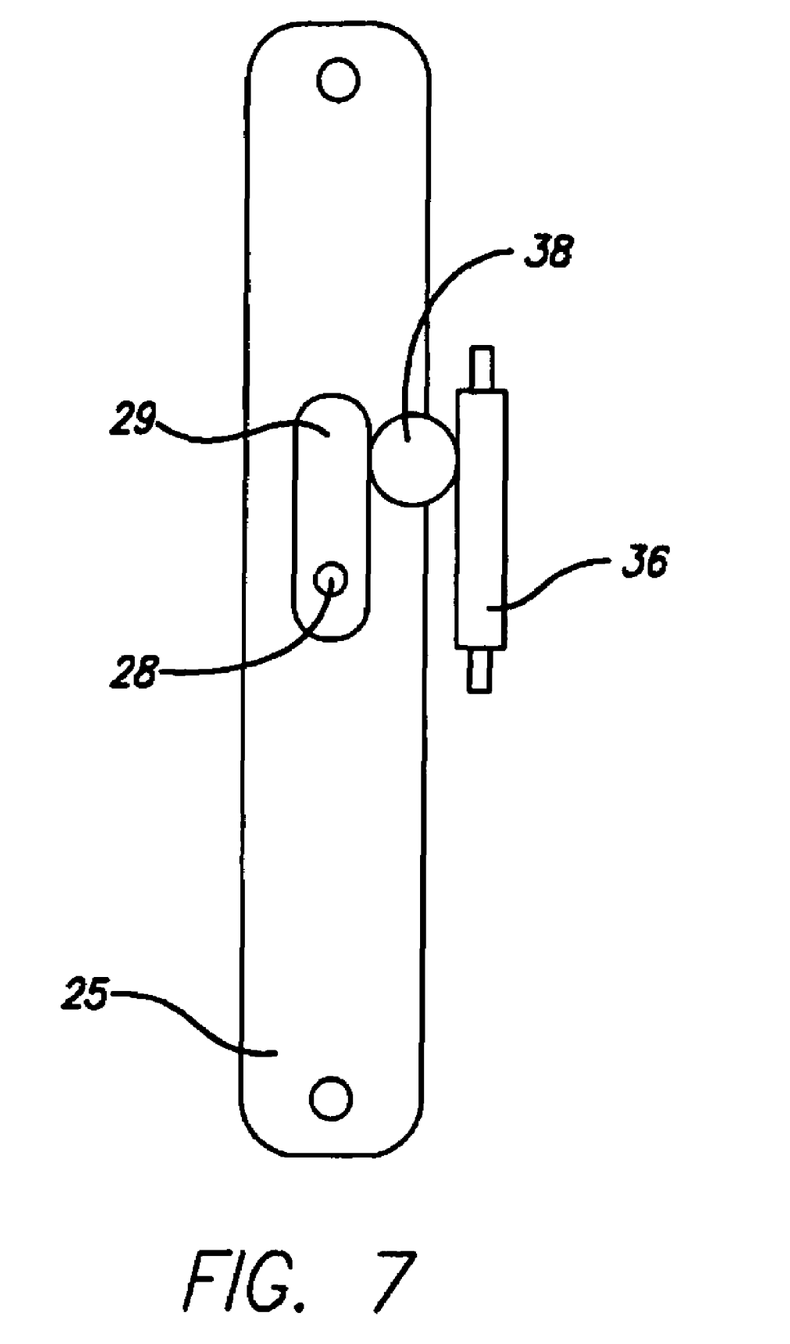
FIG. 7 is a diagrammatic illustration of a portion of the endless flexible belt tracking system that controls the tracking of the belt as it traverses its path about the flexible transport solid imaging system.

Looking now at FIGS. 6 and 7, belt tracking motor 26 exerts a rotational force on tracking control arm 29. The control arm 29 is attached to mounting arm 36 via any linkage suitable to pivot the drive roller carriage 27, such as magnetic ball 38. Ball 38 rests in a slot in the control arm 29 and a countersink in mounting arm 36. If motor 22 exerts a clockwise rotational force, the control arm 29 pushes the magnetic ball 38 into the mounting arm 36, forcing the drive roller carriage 27 away from the mounting arm 36. Conversely, if the motor 22 exerts a counterclockwise rotational force, the control arm 29 moves away from the mounting arm 36 and the magnetic force pulls the carriage toward the mounting arm 36. This rotates the drive roller carriage about pivot point 31 of FIG. 6. Thus, the drive rollers 14 and 15 rotate to steer the belt 11. As seen in FIGS. 1 and 2, if the drive roller carriage 27 rotates clockwise, the belt 11 steers to the left, and with a counter clockwise rotation, it steers to the right. Looking again at FIG. 2, tracking sensors 33 and 37 are placed apart at a distance so the width of the belt 11 just extends over the edges of the sensors 33 and 37, respectively. Sensors 33 and 37 are optical sensors that sense the presence of the belt 11. In operation, as the belt 11 is being driven it will translate laterally until it uncovers one of the sensors 33 or 37. The force on the tracking motor 22 will then be reversed and the belt 11 will translate until the other sensor is uncovered, and the process will reverse again. In this manner, the belt 11 is constantly moving laterally back and forth across a small distance.

An appropriate sub-pixel image displacement device, not shown, is placed between the radiation light source 44 and the target area on the belt 11 that is coated with the solidifiable liquid build material 47. The exposure of the image cross-section by illuminating selected pixels creates a solidified portion of the cross-section of the three-dimensional object being formed. The sub-pixel image displacement device alternatively can be a mirror with the pixel shifting device being located outside of the runs of the endless belt 11 or it could combine both a mirror and pixel shifting device in a single element.

Any suitable fluid build material capable of solidification in response to the application of an appropriate form of energy stimulation may be employed in the practice of the present invention. Many liquid state chemicals are known which can be induced to change to solid state polymer plastic by irradiation with UV radiation or visible light. A suitable visible light curable photopolymer that may be employed in the practice of the present invention is shown in Table I below. This formulation exhibited excellent resolution and photospeed when utilized with a BenQ PB7220 projector. The parts created displayed outstanding green strength with balanced stiffness and toughness.

TABLE 1

|  | Units of Weight | Weight Percent |
| --- | --- | --- |
| Acrylate-24 (from Sartomer Company) |  | % |
| PRO 6817 (from Sartomer Company) | 4.8 | 23.02 |
| SR 833S (from Sartomer Company) | 3.5 | 16.79 |
| Ebecryl 83 (from UCB Chemicals Corp.) | 2.4 | 11.51 |
| PRO 6169 (from Sartomer Company) | 5.2 | 24.94 |
| SR 531 (from Sartomer Company) | 3.6 | 17.27 |
| Irgacure I-907 (From Ciba Specialty Chemicals, Inc.) | 0.75 | 3.60 |
| Irgacure 1-819 (From Ciba Specialty Chemicals, Inc.) | 0.6 | 2.88 |
| Total | 20.85 | 100.00 |

Additives can be incorporated into the formulation to promote release ability from the transparent transport means, such as silicone acrylate materials.

In operation, data to build a three-dimensional object is sent to the flexible transport solid imaging system from a CAD station (not shown) that converts the CAD data to a suitable digital layer data format and feeds it to a computer control system (also not shown) where the object data is manipulated to optimize the data via an algorithm to provide on/off instructions for the digital light projector. The solid imaging layer data is attained by the CAD data being processed by a slicing program to create cross-sectional data. An algorithm is then applied to the cross-sectional data by a suitable controller, such as a microprocessor or computer, to create the instructions for the digital light projector to illuminate selected pixels in the image within the boundary of the three-dimensional object in the cross-section being formed. An appropriate pixel shifting image displacement device can be employed to increase the resolution and edge smoothness of the cross-sections produced.

Upon completion of the imaging of a layer, the platform 53 is lowered. Since the cured image is now stuck to both the belt 11 and platform 53, the belt 11 is pulled downward with the platform 53 into a bow shape until the part layer peels from the belt 11. The belt 11 then returns back into its straightened form. The radiation transparent belt 11 carrying the build material 47 peels away from the exposed and solidified layer of build material forming the cross-section of the three-dimensional part being formed with no horizontal motion therebetween. The flexibility of the radiation transparent belt 11 enables the separation to occur in a peeling type of action because the separation force is proportional to the width of the exposed area of the build material 47 as opposed to the total area of the exposed build material, as occurs in the case of an inflexible planar surface.

The substrate on which the part is built on the build support platform 53 is chosen so that the part's bond to it is stronger than its bond to the belt 11. The substrate material should be pervious, flexible, and easily attachable to the build support platform 53. It can be a fine sandpaper or similar material to give grip, but more preferably is a porous material, such as ground silicone, that allows any wet, uncured material to flow away from the part to keep the part as dry as possible.

As the part grows, each new layer bonds to the cured build material of the layer below it. Once the platform is in its lowest position, the belt is driven in direction of travel 21 to re-coat the belt 11 with the build material 47. The belt 11 will be driven approximately 12" to 18" to establish a consistent layer thickness of the build material. The platform 53 is then raised into position. Since there is now a 0.001" thick slice of the part on the platform 53, the platform 53 is raised into a position 0.001" lower than the previous one so that it is now the top of the part that is in intimate contact with the coating of build material 47 on the surface 51 of the belt 11. In practice, this positioning is controlled by the stepper motors 58 that raise and lower the platform 53 in a manner that is very accurate in its movement and repeatable. If, for example, motors 58 move the platform down 0.500" after each exposure, but move up only 0.499", they will always compensate for the 0.001" buildup per cycle. Now that the belt 11 has been re-coated and the platform 53 is in position, the next slice of the part is projected, and the process continues until the part is complete.

While the invention has been described above with references to specific embodiments thereof, it is apparent that many changes, modifications and variations in the materials, arrangements of parts and steps can be made without departing from the inventive concept disclosed herein. For example, where a laser, laser scanning mirrors and other related apparatus are employed in lieu of digital image projection equipment, there is no sub-pixel image placement device employed. Where supports are used in the build process, either two separate materials or one material that is the same for the build object and the supports are employed.

Accordingly, the spirit and broad scope of the appended claims are intended to embrace all such changes, modifications and variations that may occur to one of skill in the art upon a reading of the disclosure. All patent applications, patents and other publications cited herein are incorporated by reference in their entirety.

Having thus described the invention, what is claimed is:

1. A solid imaging system with a solidifiable liquid build material that layer-by-layer forms a three-dimensional object form cross-sectional data, comprising in combination:
   a. a frame;
   b. a solidifiable liquid build material dispenser connected to the frame having an opening through which the build material is dispensed;
   c. an endless flexible build material carrier rotatably mounted to the frame, the carrier having a first side and opposing second side between a first edge and an opposing second edge, the first side receiving liquid build material in a fluid wedge from the build material dispenser;
   d. a radiation source mounted on the frame effective upon activation to selectively solidify the liquid build material;

e. a radiation modulating device to selectively illuminate pixels in each layer of the three-dimensional object to solidify the build material; and f. build material carrier tensioning means mounted to the frame controlling the tension in the build material carrier as the build material carrier rotates about a predetermined path past the opening in the build material dispenser effective to control the fluid wedge so that less tension creates a thicker layer of build material received by the build material carrier and increased tension creates a thinner layer of build material received by the build material carrier.

2. The system according to claim 1 further comprising the build material carrier being a flexible endless belt.

3. The system according to claim 2 further comprising the flexible endless belt being radiation transparent.

4. The system according to claim 3 further comprising a drive roller carriage pivotably mounted to the frame, the drive roller carriage having at least one drive roller mounted thereto and movable therewith, the drive roller being positioned at a distance on an opposing side of the frame to at least one idler roller, the build material carrier being rotatably mounted about the drive roller and the idler roller.

5. The system according to claim 4 further comprising a plunger contactable with a pivot attachment and effective upon extension to move the attachment to extend or upon retraction to move the attachment to shorten the distance between the drive roller and the idler roller to thereby increase or decrease the tension on the build material carrier as it travels about its predetermined path.

6. The system according to claim 5 further comprising the liquid build material dispenser having an elongated channel opening through which the build material is dispensed onto the first side of the build material carrier.

7. The system according to claim 6 further comprising a tracking motor effective to offset the endless build material carrier as it travels about its predetermined path to center the build material carrier about the idler roller and drive roller.

8. The system according to claim 7 further comprising opposing sensors adjacent the first edge and the second edge effective to sense an edge and activate the tracking motor to offset the build material carrier so the build material carrier tracks to center itself about the idler roller as it is driven by the drive roller when an edge is no longer sensed.

9. The system according to claim 8 wherein the tracking motor causes the drive roller carriage to pivot about a second pivot point to cause the endless build material carrier to translate between the opposing sensors.

10. The system according to claim 1 further comprising the radiation source emitting electro-optical radiation.

11. The system according to claim 10 further comprising the radiation source emitting UV or visible radiation.

* * * * *